United States Patent
Kwon et al.

(10) Patent No.: US 10,230,116 B2
(45) Date of Patent: Mar. 12, 2019

(54) AIR SUPPLY APPARATUS AND METHOD FOR FUEL CELL

(71) Applicant: Hyundai Motor Company, Seoul (KR)

(72) Inventors: Hyuck Roul Kwon, Yongin Gyeonggi-do (KR); Chang Ha Lee, Yongin Gyeonggi-do (KR); Kyoung Ku Ha, Anyang Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1015 days.

(21) Appl. No.: 14/567,210

(22) Filed: Dec. 11, 2014

(65) Prior Publication Data

US 2015/0188161 A1 Jul. 2, 2015

(30) Foreign Application Priority Data

Dec. 30, 2013 (KR) .................. 10-2013-0167029

(51) Int. Cl.
  *H01M 8/04* (2016.01)
  *H01M 8/04111* (2016.01)

(52) U.S. Cl.
  CPC .............. *H01M 8/04111* (2013.01)

(58) Field of Classification Search
  CPC .................................................. H01M 8/04111
  See application file for complete search history.

(56) References Cited

U.S. PATENT DOCUMENTS

| | | | | |
|---|---|---|---|---|
| 2005/0002816 A1* | 1/2005 | Okayama | ............... | F01C 17/063 418/55.2 |
| 2007/0231658 A1* | 10/2007 | Kabasawa | ......... | H01M 8/04186 429/447 |
| 2011/0244343 A1* | 10/2011 | Sugawara | .......... | H01M 8/04111 429/414 |
| 2012/0328968 A1* | 12/2012 | Honda | ............... | H01M 8/04111 429/446 |
| 2014/0216036 A1* | 8/2014 | Bozzolo | ............ | H01M 8/04014 60/728 |

FOREIGN PATENT DOCUMENTS

| | | |
|---|---|---|
| JP | 2004-235076 | 8/2004 |
| JP | 2008-103228 | 5/2008 |
| JP | 2009-123550 | 6/2009 |
| JP | 2010-287541 A | 12/2010 |
| JP | 2010287541 A * | 12/2010 |
| KR | 1020130078697 | 7/2013 |

OTHER PUBLICATIONS

JP 2009-142587 machine translation (Year: 2010).*
JP 2009-142587 figures machine translation (Year: 2010).*

* cited by examiner

*Primary Examiner* — Lingwen R Zeng
(74) *Attorney, Agent, or Firm* — Mintz Levin Cohn Ferris Glovsky and Popeo, P.C.; Peter F. Corless (57) ABSTRACT

An air supply apparatus and method for a fuel cell, which supplies high-pressure air while avoiding a surge phenomenon of a turbo type compressor in a fuel cell system to which the turbo type compressor is applied is provided. In particular, a portion of air from an outlet of a compressor to an inlet of the compressor is recirculated to the supply of air supplied from the compressor to a stack. This recirculated air and external air introduced from the outside are mixed and supplied to the inlet of the compressor at a sufficiently high air pressure, allowing the compressor to avoid a surge region and enabling the supply of air with a high pressure and a low flow rate.

6 Claims, 5 Drawing Sheets

AIR SUPPLY APPARATUS AND METHOD FOR FUEL CELL

CROSS-REFERENCE TO RELATED APPLICATION

This application claims under 35 U.S.C. § 119(a) the benefit of Korean Patent Application No. 10-2013-0167029 filed on Dec. 30, 2013, the entire contents of which are incorporated herein by reference.

BACKGROUND (a) Technical Field

The present disclosure relates to an air supply apparatus and method for a fuel cell. More particularly, the present disclosure relates to an apparatus and method for a fuel cell, which supplies high-pressure air while avoiding a surge phenomenon of a turbo type compressor in a fuel cell system to which the turbo type compressor is applied.

(b) Background Art

Fuel cell systems generally convert chemical energy from a fuel into electricity through a chemical reaction with oxygen or another oxidizing agent. A fuel cell generally consists of an anode, a cathode and an electrolyte that allows charges to move between the two sides of the fuel cell. In particular, electrons are drawn from the anode to the cathode through an external circuit, producing direct current electricity that can be used to power various devices or machinery, such as vehicles.

In order to provide a sufficient amount of electricity, fuel cells in a fuel cell system are often stacked to form a fuel cell stack. Also included in the system is a fuel supply apparatus for supplying fuel to the stack, an air supply apparatus for supplying air to the stack, and an exhaust apparatus for discharging moisture, air and fuel which are generated in the power generation reaction of the stack.

The air supply apparatus is very significant to the overall operation of the fuel cell. This apparatus consumes about 5% to about 20% of the maximum output of the fuel cell system. Also, the operation efficiency of the air supply apparatus is sensitive to the operating pressure due to the characteristics of apparatuses dealing with a compressible fluid.

Various types of air supply apparatuses have been used in the fuel cell systems. Some examples are disclosed in Japanese Patent Application Publication Nos. 2009-123550 and 2008-103228, and Korean Patent Application Publication No. 10-2013-0078697.

In order to efficiently operate a typical fuel cell system while providing an output required for the fuel cell system according to external environmental conditions such as atmospheric pressure and atmospheric humidity according to the altitude of the vehicle and an output desired by a driver, the operation conditions (i.e., the operation temperature, operation pressure, air volume/air Stoichiometric Ratio (SR), and Relative Humidity (RH) of supplied air) need to be optimized.

For example, when a desired output increases under designed optimal operation conditions (i.e., the operation pressure according to the operation temperature, air SR, etc.), the heat radiation load increases, allowing the operation temperature to exceed the standard operation temperature (desired operation temperature or optimal temperature).

In this case, for the maintenance of smooth humidification (maintenance of water balance) and the improvement of the system efficiency, it is effective to increase the operation pressure (air supply pressure) and reduce the air SR (air volume).

Figure 4:
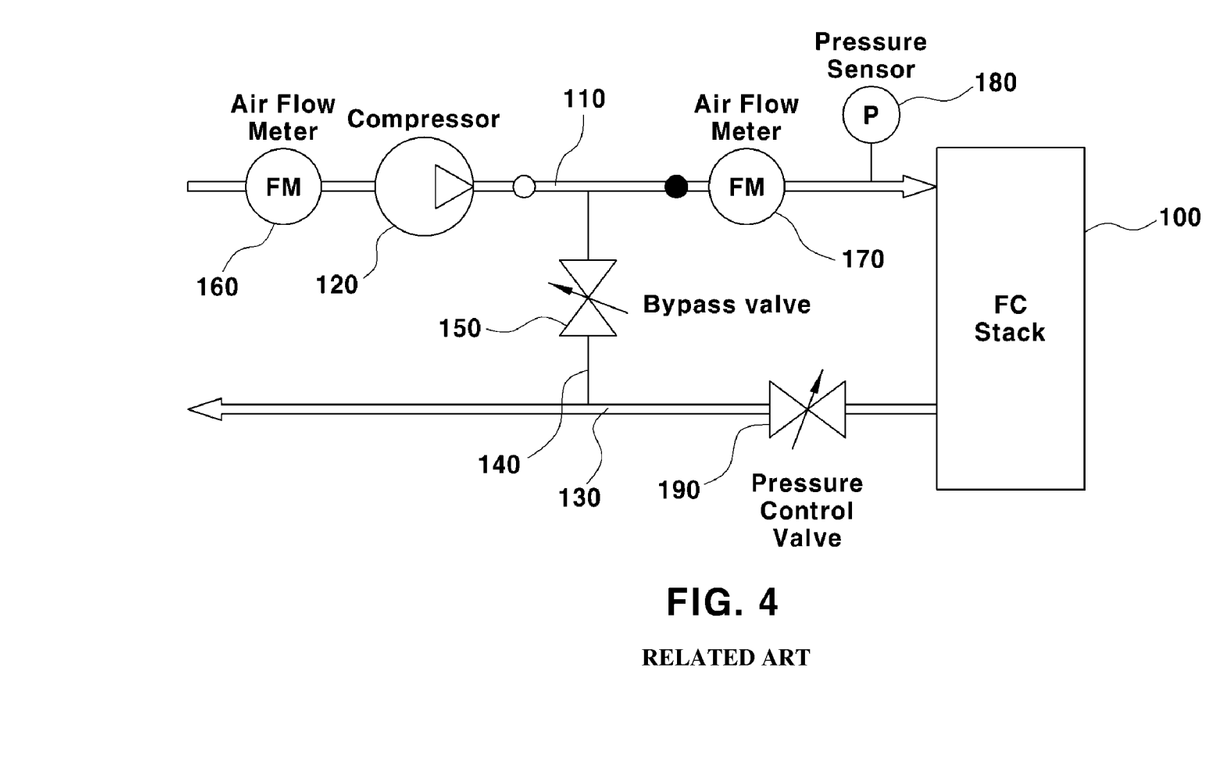
FIG. 4 is a schematic view illustrating a typical air supply apparatus for a fuel cell.

FIG. 4 is a schematic view illustrating a typical air supply apparatus for a fuel cell. As shown in FIG. 4, in the air supply apparatus for the fuel cell, a compressor 120 is disposed on an air inflow line 110 of a fuel cell stack 100, and a bypass line 140 connects between the air inflow line 110 and an air outflow line 130 of the fuel cell stack 100. In this case, a to bypass valve 150 is disposed on the bypass line 140. Unexplained reference numerals 160 and 170 denote air flow meters, and reference numerals 180 and 190 denote a pressure sensor and a pressure control valve, respectively.

Figure 5:
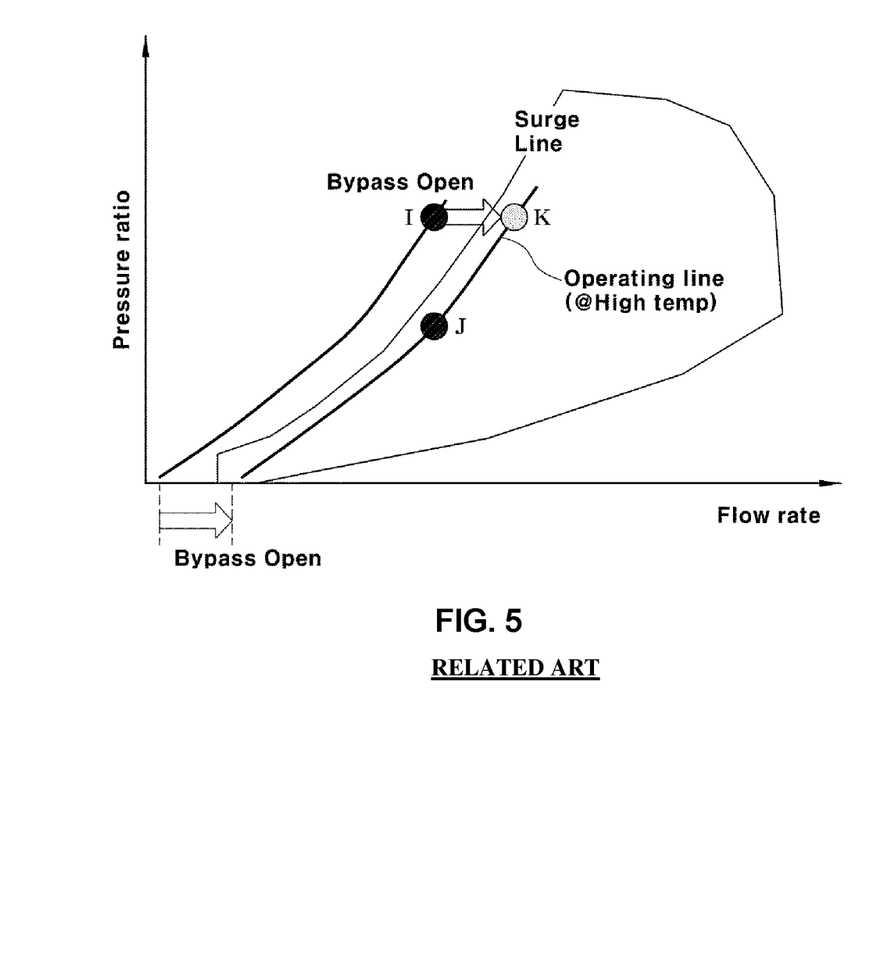
FIG. 5 is a graph illustrating an effect of a bypass valve in a typical air supply apparatus for a fuel cell.

As shown in FIG. 5, the operation condition desired by the stack is a condition I, and the operable condition of the turbo compressor while satisfying the flow rate of the condition I is a condition J, but the condition J is not satisfied. In particular, when the operation condition is a condition K, the pressure may be met, but excessive air is supplied.

Accordingly, to avoid a surge and to satisfy the operation condition I desired by the stack, the turbo compressor operates under the condition K, and excessive air (e.g., difference of air volumes between points I and K) is discharged through a bypass to supply an air pressure and a flow rate that corresponds to the condition I to the stack. Additionally, when the operation temperature reaches the standard temperature (e.g., desired operation temperature or optimal temperature), and the operation condition necessary for the stack or the fuel cell system falls within the operation region (e.g., normal operation line at the right side of the surge line) of the turbo compressor, the bypass valve is closed.

Accordingly, stable operation may be achieved while avoiding the surge conditions of the air supply apparatus, by opening the bypass valve and thus changing the operation line as shown in FIG. 5. Furthermore, under high-humidity (e.g., designed operation conditions including humidity) or other conditions, the bypass valve remains or is closed. Thus, the power consumption of the compressor is reduced.

As another example, Japanese Patent Application Publication No. 2004-235076 to discloses a device in which a discharge part of a compressor suctioning, compressing, and supplying air to a fuel cell stack stores a portion of the air in an accumulator, and when the atmospheric pressure is reduced, the stored air is discharged into a suction part of the compressor from the accumulator to increase the suction pressure of the compressor.

However, some fuel cell systems use a turbo type compressor to optimize the operation conditions of the fuel cell system according to external environmental conditions and the output desired by a driver. In these types of systems, the fuel cell system may be required to operate at a substantially high pressure and relatively low flow conditions. In this case, a surge phenomenon occurs in the turbo type compressor, causing instability of the whole system. Thus, an air supply system that can be used efficiently and effectively in turbo compressor fuel cell system is required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure provides an air supply apparatus and method for a fuel cell, which can increase a suction pressure in order to improve the efficiency and performance of the air supply apparatus while effectively preventing an occurrence of a surge of a turbo type compressor even at a condition of high pressure and low flow of supplied air required in the fuel cell system, by recirculating a portion of high-pressure air discharged out of an outlet of the compressor back into an inlet of the compressor and simultaneously supplying air at a higher pressure.

In one aspect, the present disclosure provides an air supply apparatus for a fuel cell including: a compressor configured and connected to supply air to a stack of a fuel cell; a bypass line connected between an outlet and an inlet of the compressor; a bypass valve disposed within the bypass line; and an ejector that mixes bypass air and external air to increase a pressure of air and then supplying mixed air to the inlet of the compressor.

Here, the ejector may refer to a series of apparatuses that use the Venturi effect of convergent-divergent nozzle forming pressure energy of a working fluid into a low pressure at which other fluids can be attracted, converting fluid velocity energy.

Accordingly, the air supply apparatus for the fuel cell may suction air from the atmosphere and then may supply a large amount of air increased in pressure to the inlet of the compressor while recirculating a portion of air from the outlet of the compressor to the inlet of the compressor.

Here, the ejector may have a bypass air inflow aperture that receives the bypass air and a chamber inlet that receives the external air, and may include a suction chamber in which the bypass air and the external air are mixed and a throat increasing in diameter.

The air supply apparatus may include a (filter/flow rate) sensor disposed at a side of an inlet of the ejector to measure a flow rate of air introduced from the outside and remove to foreign substances. Also, the bypass valve disposed within the bypass line may be controlled by a controller that is configured to control whether or not to recirculate compressed air and an air flow rate.

In another aspect, the present disclosure provides an air supply method for a fuel cell, including: recirculating a portion of air from an outlet of a compressor to an inlet of the compressor to be supplied by the compressor to the fuel cell stack through a humidifier. In particular, the recirculated air and external air introduced from the outside are mixed and supplied to the inlet of the compressor at a higher (sufficient) air pressure to allow the compressor to avoid a surge region and provide the fuel cell stack with a supply of air at a high pressure and a low flow rate (e.g., at a surge region conditions or above).

In an exemplary embodiment, air supplied to the inlet of the compressor may be increased in pressure inside an ejector using a Venturi effect, and then may be supplied to the compressor.

Other aspects and exemplary embodiments of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Reference numerals set forth in the Drawings includes reference to the following elements as further discussed below:

10: stack
11: compressor
12: bypass line
13: bypass valve
14: ejector
15: bypass air inflow aperture
16: suction chamber
17: throat
18: throat outlet
19: filter/flow rate sensor
20: chamber inlet
21: humidifier
22: pressure control valve It should be understood that the accompanying drawings are not necessarily to scale, presenting a somewhat simplified representation of various exemplary features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

The above and other features of the invention are discussed infra.

Hereinafter, exemplary embodiments of the present disclosure will be described in detail with reference to the accompanying drawings so that those skilled in the art can easily carry out the present disclosure.

Figure 1:
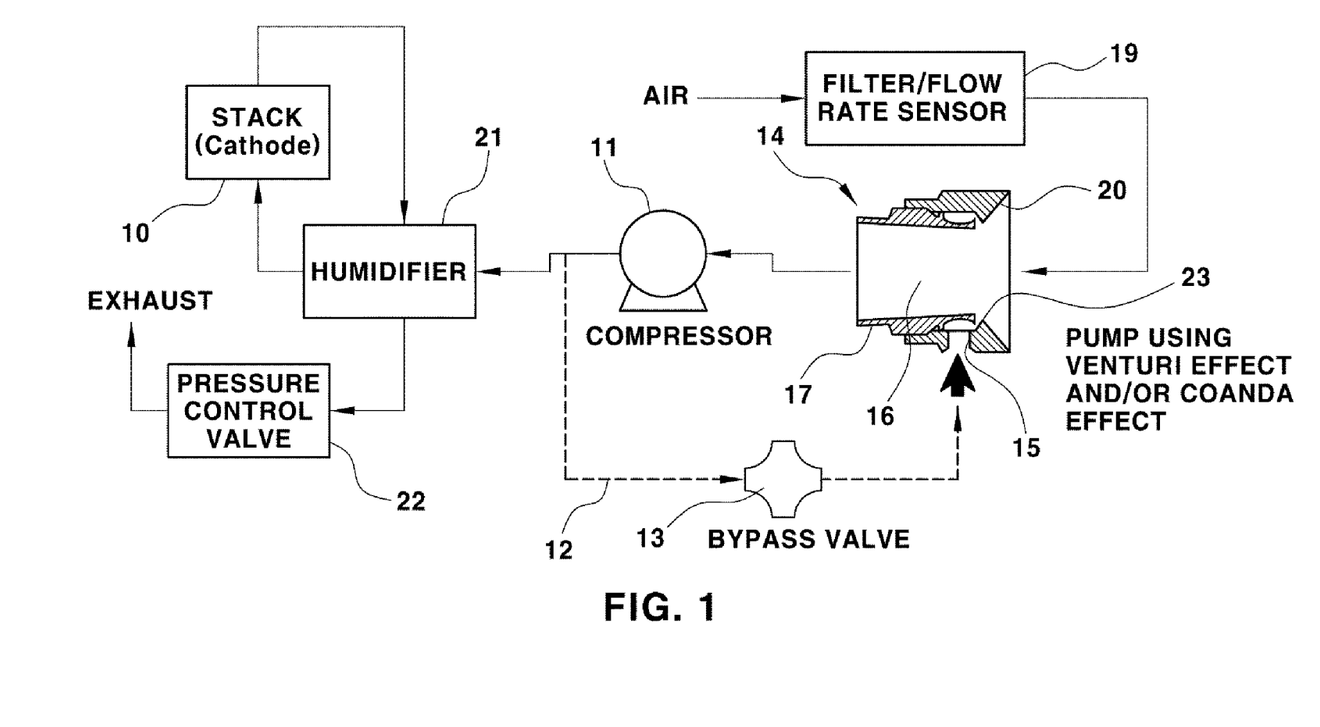
FIG. 1 is a schematic view illustrating an air supply apparatus for a fuel cell according to an exemplary embodiment of the present disclosure.

FIG. 1 is a schematic view illustrating an air supply apparatus for a fuel cell according to an exemplary embodiment of the present disclosure. As shown in FIG. 1, the air supply apparatus for the fuel cell, which is an apparatus that is disposed in a fuel cell system using a turbo type compressor to supply compressed air to a stack, may adopt a structure and method that can maintain a high outlet pressure even at a low flow rate required for the fuel cell system.

For this, the air supply apparatus may include a compressor 11 that supplies air to a stack 10, a humidifier 21 that humidifies air supplied to the stack 10, and a pressure control valve 22 that controls the pressure of exhaust gas discharged from the humidifier 21. The compressed air supplied from the compressor 11 may be supplied to the stack 10 via the humidifier 21. Moisture-containing air discharged from the stack 10 may humidify air supplied to the stack 10 in the humidifier 21 to be discharged to the atmosphere through the pressure control valve 22.

Also, a bypass line 12 may be connected between the outlet and the inlet of the compressor 11, e.g., turbo type compressor 11. In other words, the bypass line 12 may diverge from a line connected between the outlet of the compressor 11 and the humidifier 21, and may be connected to the inlet of the compressor 11. Also, a bypass valve 13 may be disposed within the bypass line 12. The bypass valve 13 may be controlled by a controller (not shown) of the fuel cell system.

Thus, a portion of high-pressure air supplied from the compressor 11 to the stack 10 may diverge and recirculate through the bypass line 12 according to whether or not the bypass valve 13 is opened or closed. Here, the bypass valve 13 may include a flow control valve that can control the flow rate of air flowing along the bypass line 12.

As mentioned above, the bypass valve 13 may be controlled by a controller of the fuel cell system to allow compressed air to recirculate through the bypass line 12. In this case, the flow rate of compressed air that recirculates through the bypass line 12 can be controlled by the bypass valve 13.

Particularly, an ejector 14 may be provided to supply a large amount of air while increasing the pressure of air supplied to the inlet of the compressor 11. The ejector 14 may serve to supply a large amount of air to the inlet of the compressor 11 while increasing the pressure of air supplied to the inlet of the compressor 11 by a certain degree using the Venturi effect. For this, the ejector 14 may include a bypass air inflow aperture 15 for receiving bypass air and a chamber inlet 20 for receiving external air, a suction chamber 16 for mixing bypass air and external air and a throat 17 having a tubular shape which increases in diameter from inlet to outlet.

That is, the suction chamber 16 having the chamber inlet 20 formed at one side thereof may be disposed to receive external air, and external air may be introduced through the rear end portion of the suction chamber 16, i.e., the chamber inlet 20. Also, the throat 17 may be integrally formed at the front end portion of the suction chamber, and may have a tube shape increasingly expanding in diameter toward the front side thereof (traveling direction of air) to a throat outlet 18.

The ejector 14 may be disposed at a rear side of the bypass valve 13 within the bypass line 12. The bypass line 12 may be connected to the bypass air inflow aperture 15 formed at a side surface of the ejector 14, and the throat 17 of the ejector 14 may be connected to the inlet of the compressor 11.

A (filter/flow rate) sensor 19 may also be disposed within a line extending from the chamber inlet 20, i.e., line through which external air is introduced. The sensor 19 may serve to measure the amount of air introduced from the outside and remove foreign substances, and may include known filter sensors and/or flow sensors.

Thus, air flowing in the bypass line 12 may be discharged into the suction chamber 16 through the bypass air inflow aperture 15, and then may be mixed with external air introduced into the chamber through the chamber inlet 20 of the suction chamber 16. Thereafter, air may be supplied to the compressor 11 while being increased in pressure through the throat 17.

For example, a portion of high-pressure air discharged out of the outlet of the compressor 11 may be sent to the ejector 14 along the bypass line 12, and may be continuously suctioned through the bypass air inflow aperture 15 at a neck of the suction chamber 16. In this case, a very low pressure may be formed around the neck of the suction chamber 16 due to external air that flows at a high speed, and external air introduced through the chamber inlet 20 of the suction chamber 16 may be mixed with bypass air suctioned through the bypass air inflow aperture 15. Thus, bypass air and external air that are mixed may pass through the throat 17, and then may be compressed and discharged according to the Coanda effect to be supplied to the compressor 11.

Furthermore, compress air flows from the supply inlet into an annular chamber. The supply air may be throttled by an annular gap and the resultant thin layer of high velocity air may adhere to the profile which turns the flow through 90° to pass down the bore. The action of the high velocity supply air flowing over the profile may cause a pressure drop which induces substantial volumes of ambient air. This induced flow may be augmented, and may gain velocity, by contact with the supply air flow through the bore of the unit.

Figure 2:
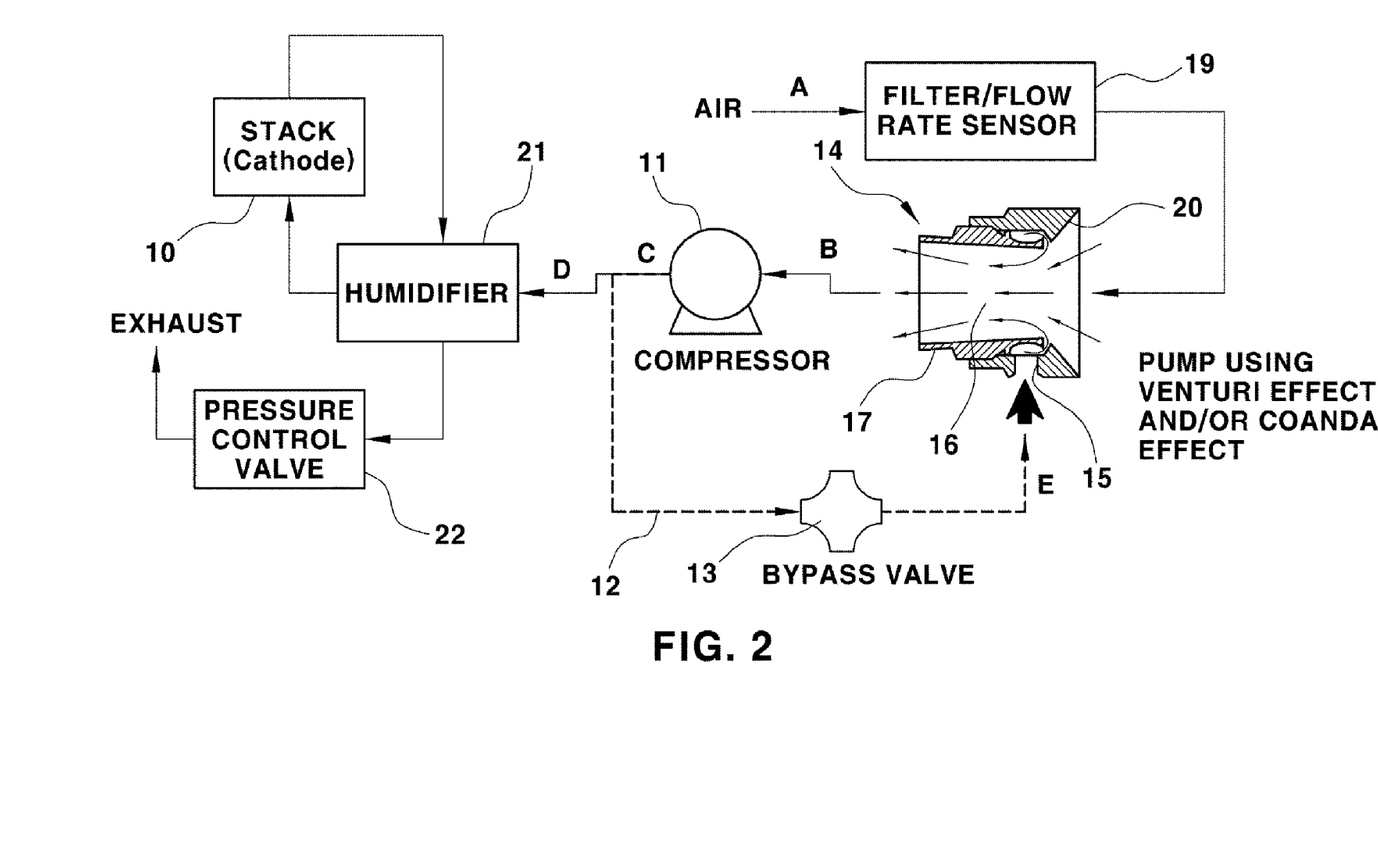
FIG. 2 is a schematic view illustrating an operation state of an air supply apparatus for a fuel cell according to an exemplary embodiment of the present disclosure.
Figure 3:
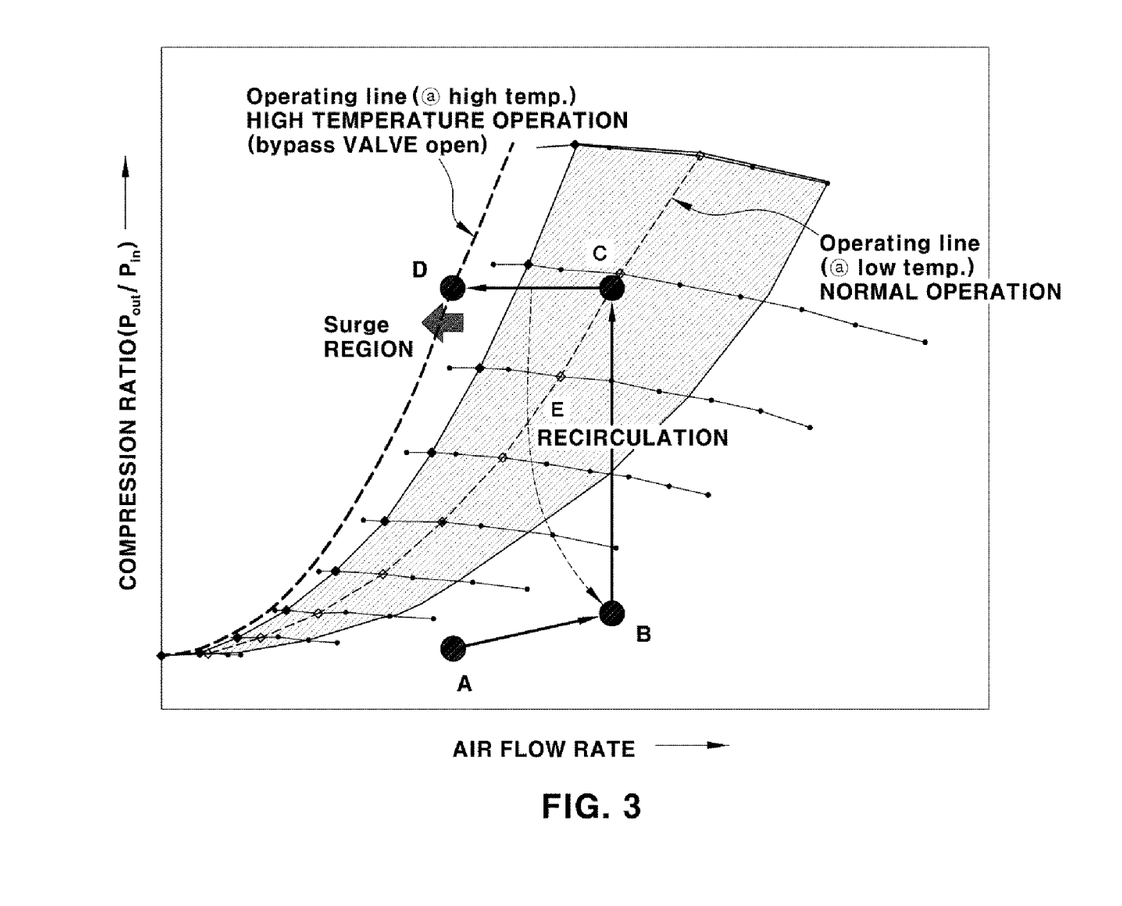
FIG. 3 is a graph illustrating a relationship between an air flow rate and a compression ratio during an operation of an air supply apparatus for a fuel cell according to an exemplary embodiment of the present disclosure.

FIG. 2 is a schematic view illustrating an operation state of an air supply apparatus for a fuel cell according to an exemplary embodiment of the present disclosure. FIG. 3 is a graph illustrating a relationship between an air flow rate and a compression ratio during an operation of an air supply apparatus for a fuel cell according to an exemplary embodiment of the present disclosure.

As shown in FIG. 2, if necessary during the operation of the fuel cell system, for example, when the outdoor temperature is high and a high output is needed, i.e., when a high operation pressure needs to be maintained under a high temperature operation condition and a low atmospheric pressure conditions (i.e., at higher altitudes), for the operation under relatively high operation pressure (air supply pressure) and low air Stoichiometric Ratio (SR) (air volume) conditions, a portion of high-pressure air may be recirculated from the outlet of the compressor 11 to the inlet of the compressor 11 through the bypass line 12.

As shown in FIG. 2, when necessary during the operation of the fuel cell system, for example, when more output is required and the operating temperature is increased the operation pressure is increased and the air low air Stoichiometric Ratio (SR) (air volume) is decreased under increased operation temperature and a low atmospheric pressure conditions (i.e., at higher altitudes). A portion of high-pressure air may be recirculated from the outlet of the compressor 11 to the inlet of the compressor 11 through the bypass line 12.

In this case, high-pressure air that is recirculated may be supplied into the ejector 14, and simultaneously, atmospheric air may be allowed to be suctioned into suction chamber 16, allowing a large amount of air increased in pressure by a certain degree to be supplied to the inlet of the compressor 11. Thus, the air volume can be increased such that the compressor can operate while avoiding a surge region, and air can be compressed and supplied using air that is recirculated, thereby improving the system efficiency by reducing the power consumption of the compressor.

That is, as shown in FIG. 3, when the system operation is changed from a normal operation to a high-temperature operation state, the system may operate according to a path of a→b→c→d→e, thereby preventing the compressor from entering the surge region and thus allowing the system to efficiently operate.

Thus, under the high-temperature operation (and thus high output) of the fuel cell system, relatively high pressure/low flow air supply can be achieved without a surge. Also, since the inlet pressure of the compressor increases due to the operation of the ejector, the to power consumption of the compressor can be reduced.

As shown in Equations 1 and 2 below, as Pin (suction pressure of compressor) increases, the power consumption of the compressor may be significantly reduced.

$$\therefore \text{air}_{usage} = 3.57 \times 10^{-7} \times SR_{air} \times \frac{P_e}{V_c} (\text{kg/s}) \quad (1)$$

Here, $\text{air}_{usage}$ denotes consumption of air (kg/s), and $SR_{air}$ denotes stoichiometric ratio of air. Also, $P_e$ denotes stack power (Watts), and $V_c$ denotes average voltage of cell.

$$\therefore P_{compressor} = \text{air}_{usage} \times C_{p\_air} \times \frac{T_{in}}{\eta_{c\_overall}} \left[ \left( \frac{P_{out}}{P_{in}} \right)^{\frac{k-1}{k}} - 1 \right] (\text{Watts}) \quad (2)$$

Here, $P_{compressor}$ denotes power consumption of compressor (Watts), and $C_{p\_air}$ denotes specific heat at constant pressure (1004 j/kgK) of air. $T_{in}$ denotes temperature of suctioned air (K), and $\eta_{c\_overall}$ denotes overall efficiency of compressor. Also, k denotes specific heat ratio of air (Cp/Cv, 1.4), and $P_{out}$ denotes discharge pressure of compressor (kPa). $P_{in}$ denotes suction pressure of compressor (kPa).

Hereinafter, an overall operation method of the air supply apparatus for the fuel cell will be described as follows.

In one embodiment, under a high-temperature operation condition requiring a high output in a situation where high-pressure air discharged from the compressor is supplied to the stack through the humidifier along with the operation of the fuel cell system, a process of recirculating a portion of air from the outlet of the compressor to the inlet of the compressor may be performed.

In this case, a process of mixing air recirculating during the air recirculation process and air introduced from the outside in the suction chamber and simultaneously supplying mixed air to the inlet of the compressor with a higher air pressure may be performed. Here, the pressure of the air supplied to the inlet of the compressor may be increased inside of the ejector using the Venturi effect. Thus, the compressor can operate while avoiding a surge region and the overall efficiency of the system can be improved while satisfying t a high pressure and a relatively low flow rate of supplied air required by the fuel cell system.

Advantageously, the air supply apparatus and method for a fuel cell according to an embodiment of the present disclosure has the following advantages:

First, a portion of high-pressure air is recirculated from the outlet of a compressor to the inlet of the compressor, and a large amount of air, the pressure of which is increased up to a certain degree by mixing the high-pressure air and atmospheric air, is supplied to the inlet of the compressor. Thus, since the turbo type compressor applied to a fuel cell can maintain a high air pressure even at a low flow rate required for a fuel cell system, the compressor can operate while avoiding a surge region.

Second, the pressure of air supplied to the compressor is increased using recirculating air. Thus, since the power consumption of the compressor is reduced, the efficiency of the system can be improved.

Third, a bypass valve controlled by a controller of the fuel cell system can be appropriately operated according to the system states. For example, the bypass valve can determine whether or not to recirculate air and control the flow rate of air when the recirculation of compressed air is needed.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An air supply apparatus for a fuel cell comprising:
    a compressor configured to supply air to a stack of a fuel cell;
    a bypass line connected between an outlet and an inlet of the compressor;
    a bypass valve disposed within the bypass line; and
    an ejector that mixes bypass air and external air to increase a pressure of air within the stack and then supplies mixed air to the inlet of the compressor, the ejector being connected between the inlet of the compressor and a rear side of the bypass valve,
    wherein the ejector suctions atmospheric air to supply air increased in pressure to the inlet of the compressor while recirculating a portion of air from the outlet of the compressor back to the inlet of the compressor,
    wherein the objector includes;
        a bypass air inflow aperture that receives the bypass air;
        a chamber inlet that receives the external air;
        a suction chamber in which the bypass air and the external air mixed; and
        a throat increasing in diameter, and
    wherein the bypass line is connected to the bypass air inflow aperture formed at a side surface of the ejector, and the throat of the ejector is connected to the inlet of the compressor.

2. The air supply apparatus of claim 1, comprising a sensor disposed on one side of an inlet of the ejector to measure a flow rate of air introduced from the outside and filter out foreign substances.

3. The air supply apparatus of claim 1, wherein the bypass valve disposed within the bypass line is controlled by a controller configured to control whether or not to recirculate compressed air and an air flow rate.

4. The air supply apparatus of claim 1, wherein the compressor comprises a turbo type compressor.

5. An air supply method for a fuel cell, comprising:
recirculating a portion of air from an outlet of a compressor back to an inlet of the compressor to be supplied by the compressor to a fuel cell stack,
wherein the recirculated air and external air introduced from the outside are mixed and supplied to the inlet of the compressor at a sufficient air pressure by an ejector to allow the compressor to avoid a surge region and provide the fuel cell stack with a supply of air at a high pressure and a low flow rate;
wherein the ejector suctions atmospheric air to supply air increased in pressure to the inlet of the compressor while recirculating a portion of air from the outlet of the compressor back to the inlet of the compressor,
wherein the ejector includes:
a bypass air inflow aperture that receives the bypass air;
a chamber inlet that receives the external air;
a suction chamber in which the bypass air and the external air are mixed; and
a throat increasing in diameter, and
wherein a bypass line is connected to the bypass air inflow aperture formed at a side surface of the ejector, and the throat of the ejector is connected to the inlet of the compressor.

6. The air supply method of claim 5, wherein air supplied to the inlet of the compressor is increased in pressure inside the ejector using a Venturi effect, and then is supplied to the inlet of the compressor.

* * * * *